United States Patent Office 3,677,770
Patented July 18, 1972

3,677,770
CARBONATED CANDY
Frank Witzel, Spring Valley, N.Y., assignor to
Beech-Nut, Inc., New York, N.Y.
No Drawing. Filed Oct. 7, 1970, Ser. No. 78,910
Int. Cl. A23g 3/00
U.S. Cl. 99—134 R  2 Claims

ABSTRACT OF THE DISCLOSURE

The off-taste present in effervescent hard candy due to unreacted food acidulant as well as salt formed by the reaction of the efferverscent factors, i.e., leavening agent and acidulant, is overcome by incorporating a small amount of a saccharin into the candy.

BACKGROUND OF THE INVENTION

The incorporation into candy of effervescent factors which interact in an aqueous medium to form carbon dioxide is known. The liberated carbon dioxide imparts to the consumer the taste sensation associated with carbonated beverages. The problem associated with such effervescent candy is the off-taste due to unreacted food acidulant as wall as the salt formed by reaction between the efferverscent factors, e.g., sodium bicarbonate and an acidulant. This off-taste is detrimental to consumer acceptance of the product.

OBJECTS OF THE INVENTION

It is, therefore, an objejct of the present invention to provide a method for overcoming the off-taste due to the effervescent factors in effervescent candy. A further object is to provide an efferverscent candy having an acceptable taste. These and other objects of the present invention will be apparent from the following description.

SUMMARY OF THE INVENTION

The off-taste of effervescent candy consisting principally of one or more sugars, and optionally, flavoring and coloring matter and other additives, wherein the efferverscent factors comprise a leavening agent and an acidulant, is overcome by incorporating into the candy from about 0.01 to about 0.5% of saccharin or a saccharin salt.

DETAILED DESCRIPTION

Sugar is an important ingredient of effervescent candy. The effervescent candy is prepared by fusing a sugar or a mixture of sugars and then incorporating the effervescent factors, flavoring and coloring matter and other additives into the fused sugar. The sugars employed in the present invention are preferably those which may readily be fused or melted on heating to form a liquid and which may readily be converted to a solid on return to and maintenance at room temperature.

Although the terms "fuse" or "melt" will be herein employed, it will be apparent to those skilled in the art that the fusion or melting point need not be a fixed precise point at which the material fuses or melts, but rather that these terms embrace a range or even a situation where the materials have no melting point at all in the strict physiochemical sense. The terms include the passage from a solid state to a liquid state and also the formation of a solution-liquid phase by the dissolving of solid in any water which may be present.

Included among the preferred fusible sugars are those which, on cooling, pass from the liquid phase to the solid phase by supercooling. While not wishing to be limited by this mode of description, it does appear that some of the preferred sugars exist in solid form as super-cooled liquids with no sharp melting point.

It will be apparent that those fusible sugars which may be employed have a melting or fusion point below their decomposition temperature, and that no substantial decomposition occurs at the melting or fusion temperature which would interfere with fusion, melting, or solidification on cooling.

Although as will be apparent from this disclosure, the fusible sugars which may be used in the practice of this invention include those which have a melting or fusing point which falls within a wide range, the preferred materials will be those having a melting or fusing point at temperatures of from slightly above room temperature to about 300° F. (149° C.).

The fusible sugars which may be employed in the practice of this invention include sugars and their derivatives such as sugar alcohols and sugar acids. Typical fusible monosaccharide sugars include glucose, fructose (levulose), invert sugar (chemically equal parts of glucose and fructose), arabinose, etc. Typical fusible disaccharide sugars include sucrose, lactose, maltose, fructosan, etc. Typical fusible polysaccharide sugars include gentiobiose, cellobiose, panose, malto-triose, malto-tetrose, etc. Typical sugar alcohols include sorbitol and mannitol. Typical sugar acids include gluconic acid and saccharic acid.

The fusible sugars useful in connection with this invention will preferably be in near-ahydrous state. Although, for example, anhydrous sucrose having a melting point of 186° C. may be employed, it is found that the desired results may be readily obtained if a small percentage of water be present. If 1% water be present, the apparent melting or fusing point will be about 127° C.; if 2% water be present, the apparent melting or fusing point will be about 118° C. Typically the quality of water present may be about 1%–5% and fusible sugars containing these amounts of water may be said to be substantially anhydrous.

Alternatively, a hard candy mass may be prepared by heating a fusible sugar in the presence of water, i.e., a syrup. The syrup is cooked until a Brix value of at least 98.5 is reached. Any amount of water may be present although syrups containing relatively high amounts of solids are preferred as low solid syrups require too lengthy heating times to achieve the desired low water content. A typical syrup may contain, for example, a mixture of 67 Brix sugar and 80 Brix confectioner's glucose.

Although individual sugars such as sucrose may be used, it is a feature of this invention that combinations of sugars may be used. A mixture of sucrose with corn syrup (containing glucose, maltose, dextrin) is also satisfactory.

It is also a feature of this invention that the sugar may comprise a fusible mixture of sugar together with (a) dextrin; or (b) starch; or (c) gelatin; or (d) a gum, typified by agar, carragheenin, alginates, and pectin. For example, sucrose and dextrin may be employed together. In all cases the desired mixture is fusible as heretofore defined.

Other materials which may be added to the fusible sugar particularly when the product is to be used for edible purposes include: edible acids, typically citric acid, tartaric acid, adipic acid, lactic acid, fumaric acid, etc.; buffer salts, typically citrates, tartrates, etc.; flavors, typically cherry, lime, cola, root beer, etc.; or coloring, typically red, brown, yellow, etc.

It is a feature of this invention that the gasified product may be used as a "carbonated hard candy." In appearance it typically resembles hard sugar type candies. However, when the product of this invention is placed in the mouth, it liberates gas on contact with liquid as it dissolves.

Generally, the candy may consist of from about 95 parts to about 60 parts of sucrose and, correspondingly, from about 5 parts to about 40 parts of invert sugar or confectioner's glucose together with flavoring and coloring agents and other additives as may be desired.

The effervescent factors comprise a leavening agent, e.g., sodium bicarbonate, and an acidulant. The acidulant employed in conjunction with the leavening agent may be any food grade material approved for use by the Food and Drug Administration. Suitable acidulants include the following acids: citric, tartaric, malic, adipic, succinic, fumaric, acidic, hexamic, phosphoric; acid anhydrides such as glucono-Δ-lactone, succinic anhydride and acidic anhydride; and acid salts such as potassium bitartrate, sodium aluminum sulfate, monocalcium phosphate and disodium pyrophosphate.

Leavening systems which may be used in effervescent candy involve the use of a leavening agent, e.g., sodium bicarbonate, with a food acid or an acid salt or an acid anhydride. By way of example some typical leavening systems are, (1) Sodium bicarbonate plus an acid, e.g., malic acid,
(2) Sodium bicarbonate plus an acid salt, e.g., potassium acid tartrate,
(3) Sodium bicarbonate plus an acid anhydride, e.g., glucono-Δ-lactone.

Each of the foregoing systems forms carbon dioxide, water and a salt. The salts formed in the foregoing leavening system are sodium malate, sodium potassium tartrate and sodium gluconate. The salt, and also the acid, which prior to reacting with the leavening agent imparts its acid taste, are incompatible with many flavors. For example, the addition of sodium citrate to an orange flavor is detrimental to consumer acceptance. Likewise, the presence of an acid taste in a root beer or cola soft drink is detrimental to consumer acceptance.

In developing effervescent candy formulations, those skilled in the art are concerned with Brix:acid ratios, or in other words the sugar:acid or sweetness:sourness balance of a product. Increasing the sweetness of a product decreases the sourness and vice versa. Increasing the amount of sugar, however, decreases the percentage of effervescent factor and will result in amounts of leavening agent and acidulant which are too low to produce the required carbonated taste. It has now been found, however, that an artificial sweetener such as saccharin or a pharmaceutically acceptable saccharin salt, e.g., an alkali metal or alkaline earth metal salt of saccharin, may be used to increse the sweetness without altering the ratio of effervescent factors to the remainder of the candy.

The following examples illustrate the present invention without, however, limiting the same thereto.

Example 1 (comparative)

A hard candy mass having the following formulation is prepared in accordance with standard techniques:

| Ingredient: | Parts by wt. |
|---|---|
| Sucrose | 75 |
| Confectioner's glucose | 12.5 |
| Invert sugar | 12.5 |

After cooking to a solids content of 98.5%, 4.7 parts by weight of sodium carbonate and 3.58 parts of citric acid are added and folded into the hot candy mass. The mass is removed from the kettle and placed on a mechanical mixer. The hot mass is completely mixed and formed into drops by means of standard forming equipment familiar to the trade.

The candy prepared in the foregoing manner has a satisfactory effervescence or "fizz" sensation. There is, however, a noticeable off-taste due to the presence of sodium citrate.

Example 2 (comparative)

The procedure of Example 1 is repeated except that an additional 30 parts of sucrose are added to reduce the tartness due to the sodium citrate. The resulting candy has a satisfactory taste but has an insufficient level of effervescence due to the relative reduction in the amount of the effervescent factors by 27.5%.

Example 3

The procedure of Example 1 is repeated except that 0.1 part by weight of sodium saccharin is added to the candy mass on the mechanical mixer. The salt taste of the sodium citrate is completely suppressed while at the same time the product has satisfactory effervescence.

What is claimed is:

1. A method of suppressing the off-taste in effervescent hard candy containing a chemical leavening agent and an acidulant as effervescent factors, the off-taste being due to unreacted food acidulant and salt formation upon reaction of the effervescent factors in the presence of moisture, comprising incorporating into the candy mass from about 0.01% to about 0.5% by weight of saccharin or a pharmaceutically-acceptable salt of saccharin.

2. An effervescent hard candy containing a fusible sugar and as effervescent factors a chemical leavening agent and a food acidulant, and from about 0.01% to about 0.5% by weight of saccharin or a pharmaceutically-acceptable salt of saccharin.

References Cited

UNITED STATES PATENTS 3,011,897   12/1961   Grosvenor _____ 99—141 A

FOREIGN PATENTS 1,033,337   6/1966   Great Britain _____ 99—134 R

A. LOUIS MONACELL, Primary Examiner

J. M. HUNTER, Assistant Examiner